United States Patent
Shimura et al.

(10) Patent No.: US 11,384,215 B2
(45) Date of Patent: Jul. 12, 2022

(54) LIGHT-TRANSMISSIVE FOAM COMPOSITION AND PROCESS

(71) Applicant: SEKISUI VOLTEK, LLC, Coldwater, MI (US)

(72) Inventors: Keigo Shimura, Coldwater, MI (US); Kevin O'Malley, Coldwater, MI (US)

(73) Assignee: SEKISUI VOLTEK, LLC, Coldwater, MI (US)

( * ) Notice: Subject to any disclaimer, the term of this patent is extended or adjusted under 35 U.S.C. 154(b) by 63 days.

(21) Appl. No.: 17/031,034

(22) Filed: Sep. 24, 2020

(65) Prior Publication Data

US 2021/0087348 A1 Mar. 25, 2021

Related U.S. Application Data

(60) Provisional application No. 62/904,686, filed on Sep. 24, 2019.

(51) Int. Cl.
| C08J 9/00 | (2006.01) |
| C08J 9/02 | (2006.01) |
| C08J 9/10 | (2006.01) |

(52) U.S. Cl.
CPC ........... *C08J 9/103* (2013.01); *C08J 2323/06* (2013.01); *C08J 2323/12* (2013.01); *C08J 2423/06* (2013.01); *C08J 2423/12* (2013.01)

(58) Field of Classification Search
CPC .... C08J 9/103; C08J 2323/06; C08J 2323/12; C08J 2423/06; C08J 2423/12; C08J 2201/026; C08J 2323/10; C08J 2205/044; C08J 2323/04; C08J 2423/10
See application file for complete search history.

(56) References Cited

U.S. PATENT DOCUMENTS

| 3,492,250 | A | 1/1970 | Deyrup |
| 3,651,183 | A | 3/1972 | Hosoda et al. |
| 5,589,519 | A | 12/1996 | Knaus |
| 6,464,381 | B2 | 10/2002 | Anderson, Jr. et al. |
| 7,820,282 | B2 | 10/2010 | Haas et al. |
| 8,376,596 | B2 | 2/2013 | Beau et al. |
| 9,767,942 | B2 | 9/2017 | Oeuvrard et al. |
| 9,963,067 | B1 | 5/2018 | Cho et al. |
| 2016/0280128 | A1 | 9/2016 | Cannon |

FOREIGN PATENT DOCUMENTS

| CN | 104650445 A | 5/2015 | |
| EP | 0994912 B1 | 4/2006 | |
| GB | 2426006 A | * 11/2006 | ............... C08J 9/38 |
| JP | 2007138150 A | 6/2007 | |
| JP | 2008056863 A | * 3/2008 | |
| JP | 4298082 B2 | 7/2009 | |
| JP | 2014189658 A | * 10/2014 | |

OTHER PUBLICATIONS

Pérez-Tamarit et al., "Efficient prediction of cell size in solid polymeric foams by numerically solving the diffusion approximation of light scattering equation," Colloids and Surfaces A, 534 (2017) 130-137 (Year: 2017).*

* cited by examiner

*Primary Examiner* — Kara B Boyle
(74) *Attorney, Agent, or Firm* — Campbell IP Law LLC (57) ABSTRACT

A polyolefin foam having improved light-transmittance comprises an average cell size of about 70 microns to about 500 microns; a total cell wall thickness to gauge ratio of between about 0.15 to about 0.55; a basis weight of about 0.00005 lb/in$^2$ to about 0.00050 lb/in$^2$; an L color solid value of about 95 to about 45; and a light transmittance of about 10% to about 50% according to JIS K 7361-1.

A process for producing a polyolefin foam having improved light-transmittance comprises extruding a foamable sheet at a pressure from about 1 psi to about 55 psi, and foaming the foamable sheet with a foaming agent having an average diameter of about 10 to about 25 microns to produce a foam having a light transmittance of about 10% to about 50% according to JIS K 7361-1.

20 Claims, 9 Drawing Sheets

LIGHT-TRANSMISSIVE FOAM COMPOSITION AND PROCESS

PRIORITY CLAIMS

This application claims the benefit U.S. Provisional Patent Application No. 62/904,686 filed on Sep. 24, 2019, the entirety of which application is hereby incorporated by reference into this application.

BACKGROUND

The present disclosure relates in general to methods and compositions for producing foam that is light-transmissive, and more particularly, to polyolefin foams that may be used, for example, to allow for transmission of light, including illuminated display information, through molded foamed products such as used in automotive, marine, aerospace, furniture and other applications.

Many applications require the illuminated display of information or symbols for a variety of purposes. For example, in automotive applications, display screens, gauges, icons, dashboard indicators, motion sensors and other features are routinely illuminated to communicate with the driver and occupants regarding vehicle status, and facilitate the interactive control of the vehicle and its systems through the illumination of buttons, dials and touch-sensitive display screens, including in-dash entertainment systems. Further, other areas of a vehicle are commonly illuminated by lights, such as light bulbs, LEDS, or electroluminescent panels, for aesthetic and/or safety reasons, including ambient overhead and floorspace lighting, cupholders, and interior trim features.

However, as digital touch-sensitive screens become more pervasive and available in vehicles, automotive designers are looking for creative, aesthetically pleasing options for providing lighting and illuminated information without resorting to in-dash screens, dials and push buttons. Furthermore, the available surface space is limited within a vehicle, and thus lighting and controls should work optimally within those confines.

U.S. Pat. No. 6,464,381B2, for example, describes a vehicle interior component and lighting assembly wherein the interior component has a fabric disposed over a substrate or foam layer, or both. An electroluminescent panel is located between the fabric and substrate/foam layer and can direct light from the panel through the foam and fabric. In this way, the light source can be effectively hidden when not in use and can be incorporated into the interior component in a manner that requires little space. The vehicle interior component may include, for example, a headliner, door panel, vehicle seat, rear deck, sun visor, and trunk panel. Further, this arrangement can provide back lighting of a touch switch and/or vehicle interior illumination through the switch. However, this disclosure is silent regarding the properties and type of foam that may be used.

U.S. Pat. No. 9,963,067B1 describes a luminescent interior trim structure for a vehicle, the structure including: a base material; an electro luminescence (EL) sheet which is able to emit a light, and which is disposed on an upper side of the base material; a foam layer disposed on an upper side of the EL sheet; and a skin layer disposed on an upper side of the foam layer. The foam is an injection molded thermoplastic elastomer and may be chemically or physically foamed. The patent teaches the foam thickness can be determined according to the desired soft-touch feeling of the foam, and the desired design and the light emission region, in terms of transmittance and scattering of the EL film light source in dependence on the size of the foam's cells.

US20160280128A1 describes an interior trim element for a motor vehicle which comprises: a translucent carrier component with a front side and a rear side, a translucent cover material on the front side of the carrier component and a light source on the rear side of the carrier component, wherein the translucent cover material has a Shore A hardness in the range between 60 and 80, wherein the interior trim element comprises at least one surface of a storage tray or storage compartment of the motor vehicle which is visible to passengers of the motor vehicle, and wherein the light source illuminates the visible surface of the storage tray or storage compartment. The patent further describes that the translucent cover material can be laminated with a translucent backing material such as a polyolefin foam, and that the different materials of the translucent cover material and, if applicable, a backing layer, as well as of the translucent carrier, should be carefully adapted to one another so as to achieve an adequate light transmittance and a homogenous distribution over the surface of the interior trim element, including that the materials should preferably also be UV-resistant and heat-resistant.

However, none of these disclosures provide any guidance on how to achieve the numerous desired physical properties of automotive foam while maximizing or controlling light transmittance to a sufficient level. For example, the foam should still satisfy the diverse industry specifications relating to gauge, density, compression deflection, gel content, tensile strength, elongation, tear strength, thermal stability, modulus, color, and numerous other properties for each particular application's requirements.

There is therefore an unmet need in the market for an optimized foam enabling maximal and controlled levels of light transmittance while at the same time satisfying the numerous physical specifications demanded by the industry. Ideally, such foam should maximize light transmittance while at least maintaining performance to industry-desired specifications.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The present disclosure relates to a light-transmissive foam composition and process regarding the same.

In one aspect, a polyolefin foam having improved light-transmittance comprises one or more features including an average cell size of about 70 microns to about 500 microns; a total cell wall thickness to gauge ratio of between about 0.15 to about 0.55; a basis weight of about 0.00005 lb/in$^2$ to about 0.00050 lb/in$^2$; an L color solid value of about 95 to about 45; and a light transmittance of about 10% to about 50% according to JIS K 7361-1.

In another aspect, a process for producing a polyolefin foam having improved light-transmittance comprises extruding a foamable sheet at a pressure from about 1 psi to about 55; and foaming the foamable sheet with a foaming agent having an average diameter of about 10 to about 25 microns to produce a foam having a light transmittance of about 10% to about 50% according to JIS K 7361-1.

DETAILED DESCRIPTION

Disclosed herein is a polyolefin foam composition and method of producing the same, wherein the foam comprises improved light-transmissive properties suitable for a wide variety of applications requiring the transmission of light through the foam, including illuminated displays and ambient lighting for the interior trim of vehicles, for example. A foam of the present disclosure may be considered as "light-transmissive" if at least a portion of incident visible light is transmitted through the foam and can readily be detected, as in, for example, semi-transparent and translucent foams.

Polymers or resins suitable for use in a foamable sheet include but are not limited to low density polyethylene (LDPE), linear low density polyethylene (LLDPE); ethylene vinyl acetate (EVA); polypropylene (PP); ethylene propylene diene monomer (EPDM), thermoplastic olefin (TPO), thermoplastic elastomer (TPE), and rubber. Individual resins may be selected for the light-transmissive foam, as well as blends of two or more resins. Suitable foaming agents may include azodicarbonamide (ADCA), for example.

In one aspect, a polyolefin foam having improved light transmittance may be produced to comprise an average cell size of about 70 microns to about 500 microns; preferably about 80 microns to about 465 microns, and more preferably about 195 microns to about 465 microns, as well as any combination of the aforementioned upper and lower limits of those ranges.

In another aspect, the polyolefin foam having improved light transmittance may be produced to comprise a total cell wall thickness to gauge ratio of between about 0.15 to about 0.55; preferably between about 0.18 to about 0.50; and more preferably between about 0.22 to about 0.50, as well as any combination of the aforementioned upper and lower limits of those ranges.

In another aspect, the polyolefin foam having improved light transmittance may be produced to comprise a basis weight of about 0.00005 lb/in$^2$ to about 0.00050 lb/in$^2$, more preferably between about 0.00008 lb/in$^2$ to about 0.00043 lb/in$^2$, and most preferably between about 0.00008 lb/in$^2$ to about 0.00027 lb/in$^2$.

In another aspect, the polyolefin foam having improved light transmittance may be produced to comprise an L color solid value of about 95 to about 45, or about 91 to about 65, but most preferably as close to 100 as possible.

In another aspect, the polyolefin foam having improved light transmittance may be produced to comprise a light transmittance of about 10% to about 50%, about 15% to about 45%, about 15% to about 35%, about 20% to about 40%, or about 25% to about 35%, as well as any combination of the aforementioned upper and lower limits of those ranges, but most preferably as high as possible.

In another aspect, a process for producing a polyolefin foam having improved light-transmittance comprises extruding a foamable sheet at a pressure from about 1 psi to about 55; preferably at about 2 psi to about 30 psi, and more preferably at about 25 psi to about 30 psi, or alternatively at atmospheric pressure, to produce a foam having a light transmittance of about 10% to about 50%, about 15% to about 45%, about 15% to about 35%, about 20% to about 40%, or about 25% to about 35%, as well as any combination of the aforementioned upper and lower limits of those ranges, but most preferably as high as possible.

In another aspect, a process for producing a polyolefin foam having improved light-transmittance comprises foaming a foamable sheet with a foaming agent having an average particle diameter of about 10 to about 25 microns, and more preferably about 12 microns to about 20 microns, to produce a foam having a light transmittance of about 10% to about 50%, about 15% to about 45%, about 15% to about 35%, about 20% to about 40%, about 25% to about 35%, as well as any combination of the aforementioned upper and lower limits of those ranges, but most preferably as high as possible.

EXPERIMENTAL METHOD

The light transmittance of various foam samples prepared according to the description below was measured according to the Japanese Industrial Standard JIS K 7361-1 (determination of the total luminous transmittance of transparent materials) utilizing a Konica Minolta Benchtop Spectrophotometer CM-3600A. JIS K 7361-1 is based upon ISO 13468-1. Foam color was measured according to the standardized CIELAB color space (also known as CIE L*a*b* color space) as defined by the International Commission on Illumination, utilizing a HunterLab color spectrophotometer.

The following formulations of TABLE 1A were used to prepare the foam samples used in the experiments described further below.

TABLE 1A

|  | White PE | Cream PP 1 | Cream PP 2 | White PP | PP Trials |
|---|---|---|---|---|---|
| LLDPE 1 |  | 10-40 | 20-40 |  | 10-40 |
| LLDPE 2 |  | AR | AR |  |  |
| LLDPE 3 |  | 5-15 | 5-10 | 5-15 |  |
| LLDPE 4 |  |  |  | 20-50 |  |
| LDPE | 100 |  |  |  |  |
| h-PP 1 |  |  |  |  | 10-40 |
| h-PP 2 |  | 10-25 |  |  |  |

TABLE 1A-continued

| | White PE | Cream PP 1 | Cream PP 2 | White PP | PP Trials |
|---|---|---|---|---|---|
| Random copolymer PP 1 | | | 50-80 | | |
| Random copolymer PP 2 | | 30-60 | | | |
| Random copolymer PP 3 | | | | 50-80 | |
| TPE | | | | | 10-40 |
| Crosslinking Agent 1 | | 2-5 | 2-5 | | 2-5 |
| Crosslinking Agent 2 | | | | 1-5 | |
| Phenol Based AO | | 0.5-1.5 | 0.5-1.5 | 0.5-1.5 | 0.5-1.5 |
| Sulfur Based AO | 0.1-1 | 0.5-1.5 | 0.5-1.5 | 0.5-1.5 | 0.5-2 |
| Heat Stabilizer 1 | | 0.5-1 | | | 0.5-2 |
| Heat Stabilizer 2 | 0.1-1 | | 0.5-1.5 | 0.5-1.5 | 0.5-2 |
| Foaming Agent 1 | | AR | AR | | AR |
| Foaming Agent 2 | AR | | | AR | |
| Foaming Agent 3 | | | | AR | |
| FA Activator 1 | 0.5-1.5 | | | | |
| FA Activator 2 | 0.5-1.5 | | | | |
| Lubricant | 0.1-1 | | | | |

Wherein LLDPE is linear low-density polyethylene, h-PP is a homopolymer polypropylene, TPO is a thermoplastic polyolefin, TPE is a thermoplastic elastomer, AO is an antioxidant, and foaming agent (FA) such as azodicarbonamide was used in an amount as required (AR) to achieve desired foam densities tested in the Examples below as may be appreciated by a person having ordinary skill in the art.

The cream versus white color was achieved through choice of heat stabilizer which affected the basic color of the foam.

The foam formulation for each tested sample was blended and extruded through a single or twin-screw extruder and a sheet die at a temperature higher than the melt temperature of the polymers and lower than an activation temperature of the foaming agent to produce a foamable sheet. Extrusion was performed under a vacuum or below atmospheric pressure (atm) for all samples unless noted otherwise, such as denoted "Open Air" which are extruded at atmospheric pressure, or as denoted with a psi exceeding atmospheric pressure in the Examples below. Suitable air pressures for less than 1 atm extrusion may be from about 1 to about 14 psi for example (wherein 1 atm=14.7 psi).

The extruded sheet was physically irradiated with an electron beam to physically crosslink the foam at a desired gel content, preferably about 30% to about 65%, and then the sheet was foamed in a foaming oven at or above an activation temperature of the foaming agent to yield the foamed samples for testing.

The physical and performance properties of the produced foam samples were measured according to industry-standard specifications commonly used in automotive interior foams, for example, with the results shown in TABLE 1B below, with MD measured in the machine direction of foam extrusion and CM measured in the cross machine direction of foam extrusion. Draw Ratio refers to a property of the foam with respect to thermoforming, and Orange Peel refers to surface degradation during thermoforming, as may be appreciated by someone of ordinary skill in the industry.

TABLE 1B

| | | Cream PP (<1 atm) | White PP (<1 atm) | Open Air White PP (@ 1 atm) | Open Air White PP 2 (@ 1 atm) | Open Air White PP 3 (@ 1 atm) |
|---|---|---|---|---|---|---|
| Gauge (in) | | 0.117 | 0.119 | 0.122 | 0.117 | 0.063 |
| Density (pcf) | | 4.18 | 3.90 | 3.78 | 2.66 | 4.33 |
| Comp Defl 25% (psi) | | 9.5 | 8.5 | 8.3 | 4.0 | 10.2 |
| Gel % | | 48.1% | 49.2% | 48.7% | 49.4% | 44.4% |
| Tensile @ 23° C. (kgf/cm^2) | MD | 15.2 | 12.1 | 9.9 | 7.3 | 11.7 |
| | CM | 10.4 | 8.6 | 6.9 | 5.0 | 7.9 |
| Elongation @ 23° C. (%) | MD | 598% | 588% | 403% | 329% | 362% |
| | CM | 435% | 420% | 287% | 188% | 238% |
| Tear (kgf/cm) | MD | 6.1 | 6.0 | 5.7 | 4.1 | 7.5 |
| | CM | 4.7 | 4.5 | 4.4 | 2.8 | 4.9 |
| Therm Stability 10 min @ 160° C. (% Shrinkage) | MD | -14.9% | -10.9% | -15.1% | -13.1% | -18.8% |
| | CM | -7.8% | -6.6% | -5.1% | -11.9% | -11.7% |
| Therm Stability 1 hr @ 120° C. (% Shrinkage) | MD | -1.5% | -1.3% | -1.9% | -1.1% | -1.2% |
| | CM | -1.4% | -1.4% | -1.3% | -0.9% | -0.8% |
| Draw Ratio (H:D) | | 0.8 | 0.8 | 0.8 | 0.8 | 0.8 |
| Orange Peel | | PASS | PASS | PASS | PASS | PASS |
| Tensile @ 120° C. (kgf/cm^2) | MD | 3.9 | 2.9 | 2.6 | 1.9 | 2.8 |
| | CM | 2.3 | 1.8 | 1.5 | 1.0 | 1.4 |
| Elongation @ 120° C. (%) | MD | 812% | 926% | 786% | 440% | 807% |
| | CM | 435% | 515% | 400% | 247% | 326% |
| Modulus @ 120° C. 100% (kgf/cm^2) | MD | 4.3 | 6.4 | 5.7 | 6.1 | 10.9 |
| | CM | 4.2 | 4.6 | 4.6 | 3.6 | 5.1 |
| Tensile @ 160° C. (kgf/cm^2) | MD | 0.95 | 0.64 | 0.51 | 0.48 | 0.5 |
| | CM | 0.64 | 0.46 | 0.33 | 0.27 | 0.3 |
| Elongation @ 160° C. (%) | MD | 217% | 210% | 199% | 163% | 176% |
| | CM | 177% | 174% | 164% | 133% | 135% |
| Modulus @ 160° C. 100% (kgf/cm^2) | MD | 0.68 | 0.60 | 0.65 | 0.87 | 0.92 |
| | CM | 0.62 | 0.52 | 0.45 | 0.43 | 0.47 |

As shown in TABLE 1B, the foam samples represent suitable performance specifications for an automotive interior trim molded foam component, for example.

Example 1—% Light Transmittance Vs. Basis Weight of Foam

Foam samples listed in TABLE 2 below were produced according to the formulations of TABLE 1A to have differing basis weights and were each tested for % light transmittance according to JIS K 7361-1 as described previously.

TABLE 2

| | | % Transmittance | Gauge (in) | Density (pcf) | Basis Weight (lb/sq in) |
|---|---|---|---|---|---|
| Cream PP (<1 atm) | 1 | 33% | 0.080 | 2.5 | 0.00012 |
| | 2 | 14% | 0.059 | 5.0 | 0.00017 |
| | 3 | 9% | 0.110 | 3.0 | 0.00019 |
| | 4 | 15% | 0.080 | 4.2 | 0.00019 |
| White PP (<1 atm) | 1 | 34% | 0.070 | 2.0 | 0.00008 |
| | 2 | 27% | 0.080 | 2.5 | 0.00012 |
| | 3 | 23% | 0.110 | 2.0 | 0.00013 |
| | 4 | 27% | 0.100 | 4.2 | 0.00024 |
| | 5 | 20% | 0.148 | 3.0 | 0.00026 |
| | 6 | 18% | 0.161 | 3.0 | 0.00028 |
| White PE (<1 atm) | 1 | 32% | 0.031 | 5.0 | 0.00009 |
| | 2 | 24% | 0.080 | 2.0 | 0.00009 |
| | 3 | 31% | 0.031 | 6.0 | 0.00011 |
| | 4 | 26% | 0.125 | 1.5 | 0.00011 |
| | 5 | 24% | 0.118 | 2.0 | 0.00014 |
| | 6 | 22% | 0.125 | 2.0 | 0.00014 |
| | 7 | 26% | 0.063 | 4.0 | 0.00015 |
| | 8 | 25% | 0.140 | 2.0 | 0.00016 |
| | 9 | 14% | 0.250 | 1.5 | 0.00022 |
| | 10 | 23% | 0.094 | 4.0 | 0.00022 |
| | 11 | 20% | 0.188 | 2.0 | 0.00022 |
| | 12 | 21% | 0.063 | 6.0 | 0.00022 |
| | 13 | 30% | 0.063 | 6.0 | 0.00022 |
| | 14 | 16% | 0.125 | 4.0 | 0.00029 |
| | 15 | 14% | 0.250 | 2.0 | 0.00029 |
| | 16 | 16% | 0.094 | 6.0 | 0.00033 |
| | 17 | 10% | 0.125 | 6.0 | 0.00043 |
| | 18 | 17% | 0.125 | 6.0 | 0.00043 |

Figure 1:
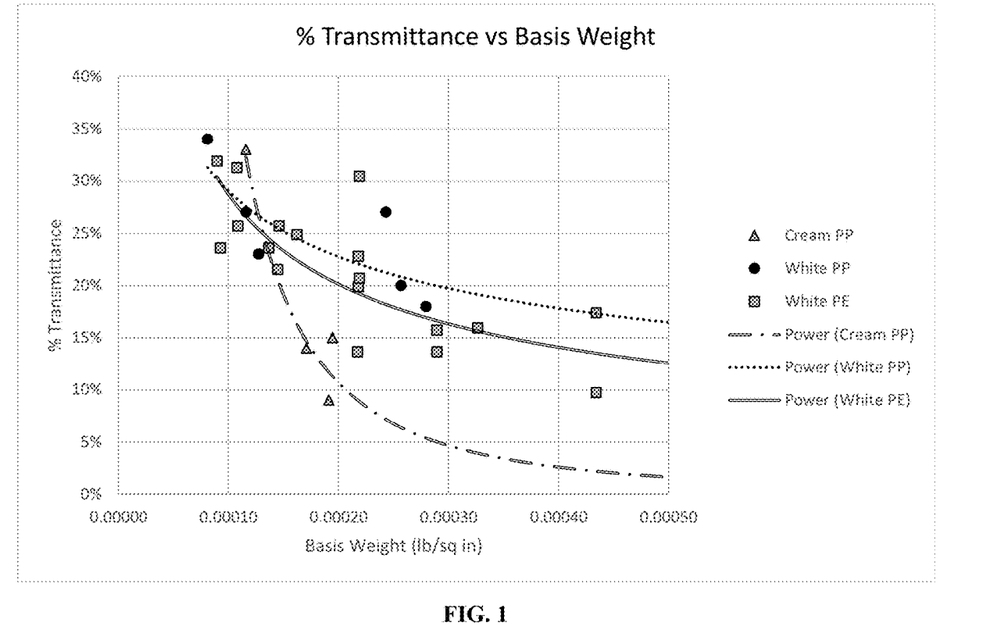
FIG. 1 is a graph depicting % light transmittance vs. basis weight of foam.

As shown by the results of TABLE 2 and the corresponding graph of FIG. 1, color affected the transmittance of light, with the white colored sample having better light transmittance than the cream colored sample having the same polypropylene (PP) resin. Further, the lower the basis weight of the foam samples, the better the light transmittance property observed. The white PE sample also showed the same trend in relation to basis weight, proving that PE behaves similarly to PP. Although light transmittance of up to 34% is shown in TABLE 2, it may be appreciated that foams having a light transmittance value of higher, including about 35% to about 50%, may be achieved using the various techniques, alone or in combination, as taught in the present disclosure including below. For example, White PP Sample 1 in TABLE 2 could be extruded at a higher air pressure to adjust the light transmittance to be higher. Further, the basis weight of the foam can be progressively lowered to increase light transmittance, such as down to about 0.00005 lb/in².

Example 2—% Light Transmittance Vs. Color of Foam & Extrusion Conditions

Foam samples of different colors listed in TABLE 3 and TABLE 4 below were prepared by the addition of colorants to the White PE formulation of TABLE 1A (<1 atm), and then tested for overall light transmittance at different basis weights, including using a HunterLab color spectrophotometer as described previously to measure L, a and b color solid values, with the "L" value for each scale indicating the level of light or dark, the "a" value redness or greenness, and the "b" value yellowness or blueness. All samples aside from the Open Air Green were extruded at (<1 atm).

TABLE 3

| | % Transmittance | Density (pcf) | Basis Weight (lb/sq in) | L | a | b |
|---|---|---|---|---|---|---|
| Open Air Green | 10% | 2.0 | 0.00014 | 65.27 | −10.88 | 25.31 |
| Ocean Blue | 2% | 2.0 | 0.00014 | 49.16 | −14.37 | −28.46 |
| White | 21% | 2.0 | 0.00014 | 81.89 | −0.66 | 0.31 |
| Orange | 6% | 2.0 | 0.00009 | 55.63 | 39.39 | 22.07 |
| Brown/Tan | 0% | 2.0 | 0.00029 | 57.08 | 5.11 | 14.85 |
| Silver Grey | 0% | 2.0 | 0.00029 | 53.36 | 0.36 | 2.72 |
| Natural | 23% | 2.0 | 0.00013 | 73.91 | −0.50 | 7.15 |
| Red | 5% | 2.5 | 0.00011 | 45.37 | 47.73 | 15.48 |
| Green | 3% | 2.5 | 0.00011 | 55.88 | −15.27 | 12.75 |
| Indigo | 0% | 4.0 | 0.00015 | 25.59 | −2.55 | −20.61 |
| Turquoise | 0% | 4.0 | 0.00029 | 53.02 | −35.32 | −4.26 |
| Yellow | 20% | 4.0 | 0.00029 | 72.56 | −4.70 | 41.23 |

TABLE 4

| | L | a | b | % Transmittance | Basis Wt (lb/sq in) |
|---|---|---|---|---|---|
| Cream | 77.19 | 4.96 | 16.12 | 14% | 0.00017 |
| | 71.39 | 1.86 | 12.83 | 9% | 0.00027 |
| White | 89.55 | −1.00 | 15.62 | 34% | 0.00008 |
| | 88.14 | −0.14 | 14.12 | 23% | 0.00013 |
| | 91.39 | −1.47 | 10.80 | 27% | 0.00024 |
| | 90.32 | −0.80 | 13.82 | 20% | 0.00026 |
| | 86.62 | 0.58 | 16.34 | 18% | 0.00028 |
| Orange | 56.67 | 44.34 | 23.05 | 6% | 0.00009 |
| Yellow | 73.77 | −4.60 | 41.77 | 20% | 0.00029 |
| Army Green | 56.51 | −15.60 | 12.70 | 3% | 0.00011 |
| Ocean Blue | 50.38 | −14.71 | −29.24 | 2% | 0.00014 |

Figure 2:
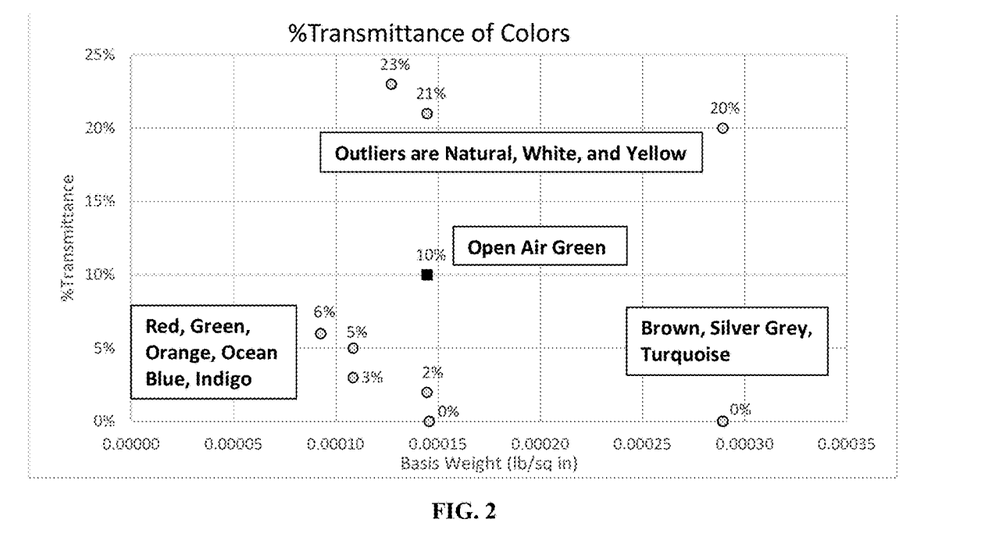
FIG. 2 is a graph depicting % light transmittance vs. basis weight and colors of foam.

As shown by the results of TABLE 3 and the corresponding graph of FIG. 2, comparing Open Air Green against the colored foams (<1 atm) showed that extruding at atmospheric pressure rather than at less than atmospheric pressure results in better % light transmittance. It was also found that natural, white, and yellow all had great % transmittance compared to other colors. Thus, creating an open-air extruded foam in natural, white, or yellow yields a large improvement in % transmittance.

Figure 3A:
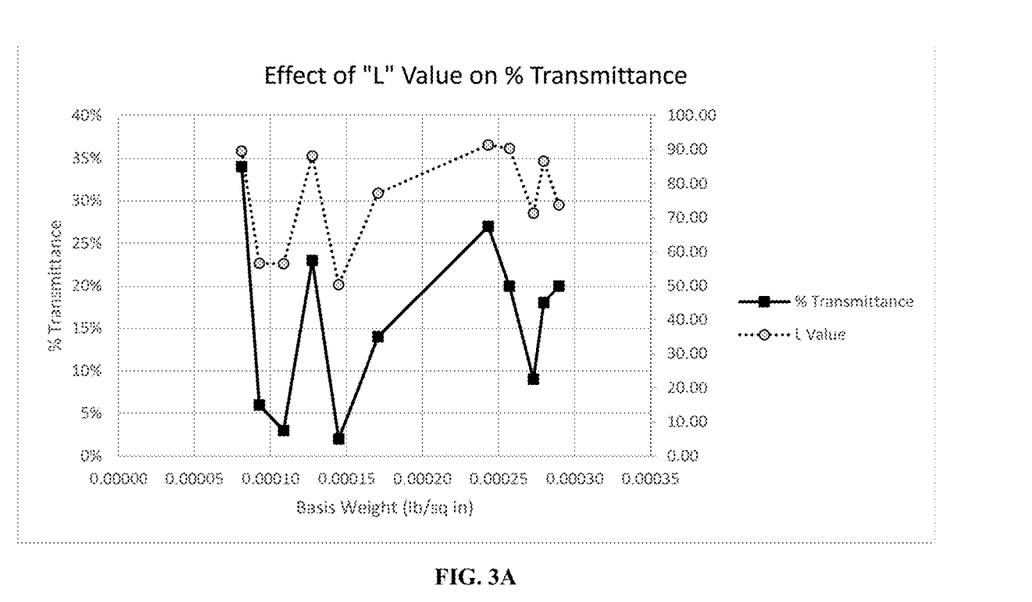
FIGS. 3A, 3B and 3C are graphs depicting % light transmittance vs. L, a, and b solid color values of foam, respectively.
Figure 3B:
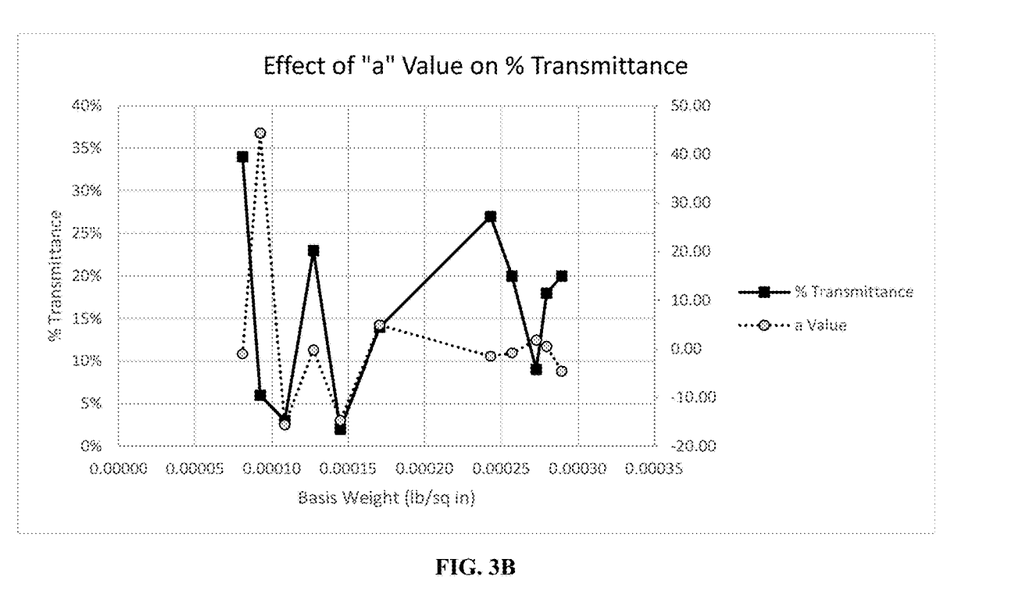
Figure 3C:
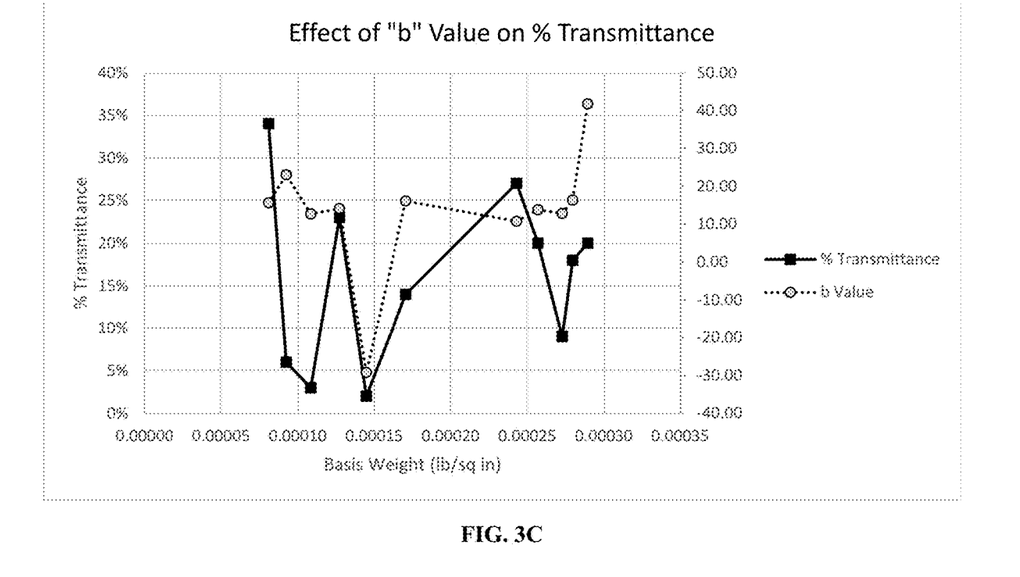

As shown by the results of TABLE 4 and the corresponding graphs of FIGS. 3A, 3B and 3C, the measured "L" value of foam had a direct relationship with % light transmittance across basis weights, with the higher the L value the higher the % transmittance (FIG. 3A), whereas there was no direct relationship with % light transmittance observable between the "a" value (FIG. 3B) and the "b" value (FIG. 3C) across basis weights, indicating that the relative redness versus greenness or yellowness versus blueness of the foam was not consequential to the % light transmittance. Accordingly, it may be appreciated that adjustment of the "L" value of the produced foam can also be used to increase or decrease % light transmittance as needed, in combination with other factors including but not limited to color of the foam and extrusion air pressures, including to achieve % light transmittance ranges beyond what was explicitly demonstrated in TABLES 3 and 4.

Example 3—% Light Transmittance Vs. Extrusion Air Pressure & Cell Size

Foam samples listed in TABLE 5 below were measured for % light transmittance based on extrusion at different air pressures and basis weights to yield foam samples of different cell sizes. The Cream PP 2 formulation was subjected to the increased extrusion air pressures listed in TABLE 5 below.

TABLE 5

|  | % Transmittance | Density (pcf) | Basis Weight (lb/sq in) | Actual Pressure (psi) | Cell Size (microns) |
|---|---|---|---|---|---|
| Under Vacuum | 23% | 3.2 | 0.00011 | 1.68 | 80 |
| Open Air | 33% | 3.3 | 0.00012 | 14.7 | 153 |
| +10 psi | 33% | 3.3 | 0.00012 | 24.7 | 160 |
| +20 psi | 32% | 3.5 | 0.00013 | 34.7 | 150 |
| +40 psi | 22% | 7.8 | 0.00022 | 54.7 | 123 |

Figure 4A:
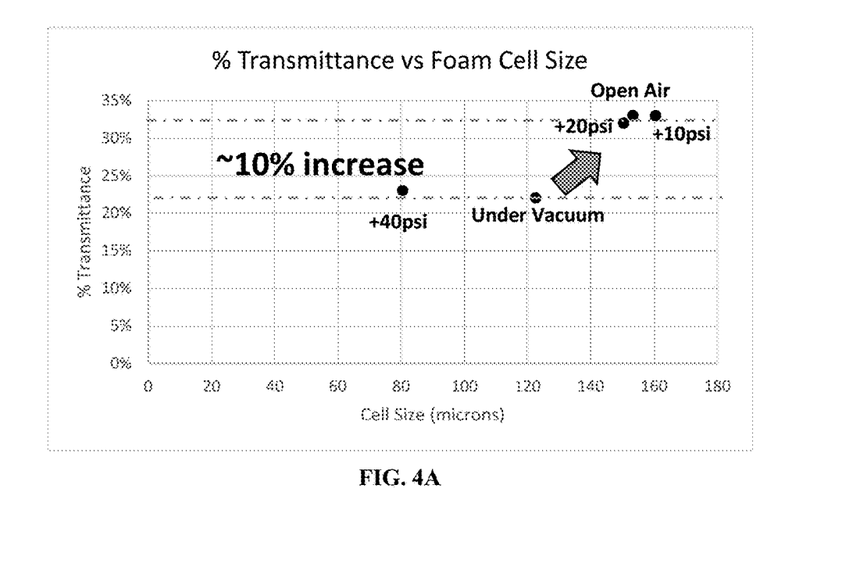
FIG. 4A is a graph depicting % light transmittance versus cell size of foam.
Figure 4B:
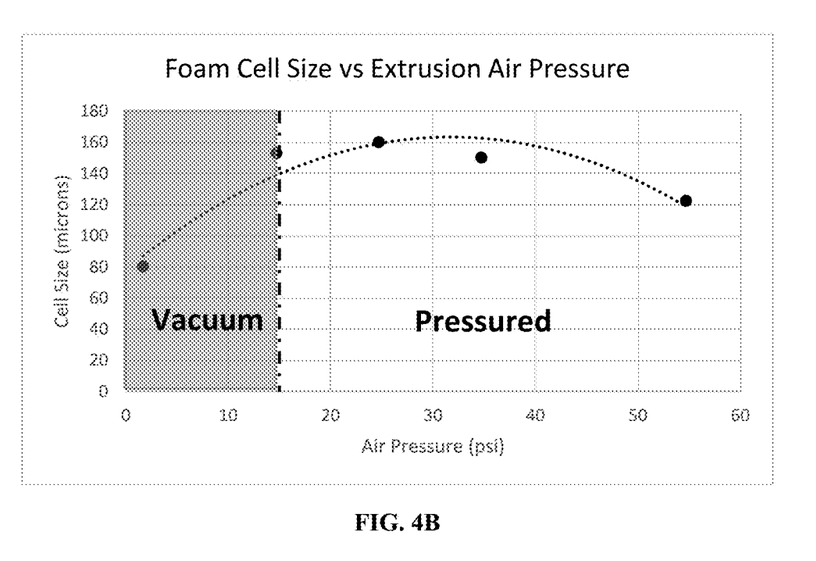
FIG. 4B is a graph depicting foam cell size versus foam extrusion air pressure.
Figure 4C:
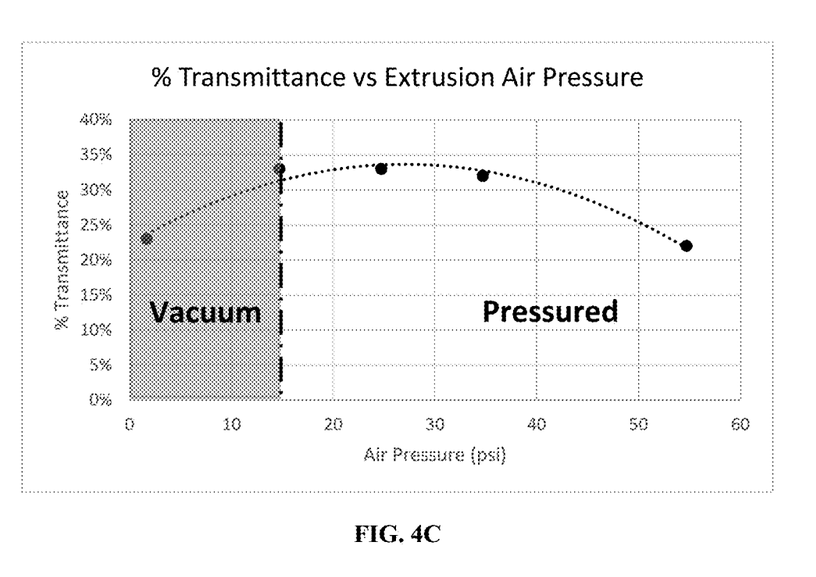
FIG. 4C is a graph depicting % light transmittance versus foam extrusion air pressure.

As shown by the results of TABLE 5 and the corresponding graphs of FIGS. 4A, 4B and 4C, as the size of the cells increased, the light transmittance improved due to less material such as cell walls obstructing the light's path (see, e.g., FIG. 4A). As shown by the graph of FIG. 4B, cell size increased as more air pressure was applied to the foam extrusion process, however, after about 10-20 psi, cell size was negatively affected. As shown in the graph of FIG. 4C, % light transmittance increased with increasing pressure (psi) which also corresponded to cell size, until about 10-20 psi where cell size was negatively affected along with % light transmittance. Accordingly, it may be appreciated that % light transmittance of the foam can be tailored by controlling cell size as another factor alone or in combination with the additional techniques taught by the present disclosure, including to achieve % light transmittance ranges beyond what was explicitly demonstrated in TABLE 5.

Example 4—% Light Transmittance Vs. Cell Wall Thickness

Foam samples listed in TABLE 6 below were measured for % light transmittance based on extrusion at different air pressures and basis weights to yield foam samples of different cell wall thicknesses. The Cream PP 2 formulation was subjected to the increased extrusion air pressures listed in TABLE 6 below. Total wall thickness was calculated as the average number of cell walls multiplied by the average individual wall thickness (as measured in microns) from a first surface to a second surface of the foam (i.e. through the foam thickness as light would be transmitted). The total wall thickness to gauge ratio was calculated by dividing the total wall thickness by the gauge of the foam.

TABLE 6

|  | % Transmittance | Density (pcf) | Basis Weight (lb/in^2) | Actual Pressure (psi) | Total Wall Thickness to Gauge Ratio |
|---|---|---|---|---|---|
| Under Vacuum | 23% | 3.2 | 0.00011 | 1.68 | 0.496 |
| Open Air | 33% | 3.3 | 0.00012 | 14.7 | 0.303 |
| +10 psi | 33% | 3.3 | 0.00012 | 24.7 | 0.256 |
| +20 psi | 32% | 3.5 | 0.00013 | 34.7 | 0.285 |
| +40 psi | 22% | 7.8 | 0.00022 | 54.7 | 0.315 |

Figure 5A:
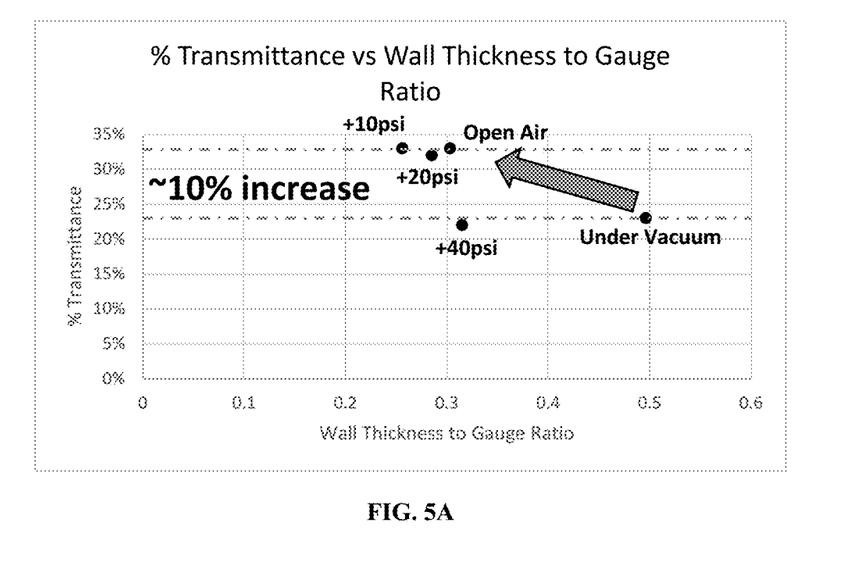
FIG. 5A is a graph depicting % light transmittance versus total wall thickness to gauge ratio of foam.
Figure 5B:
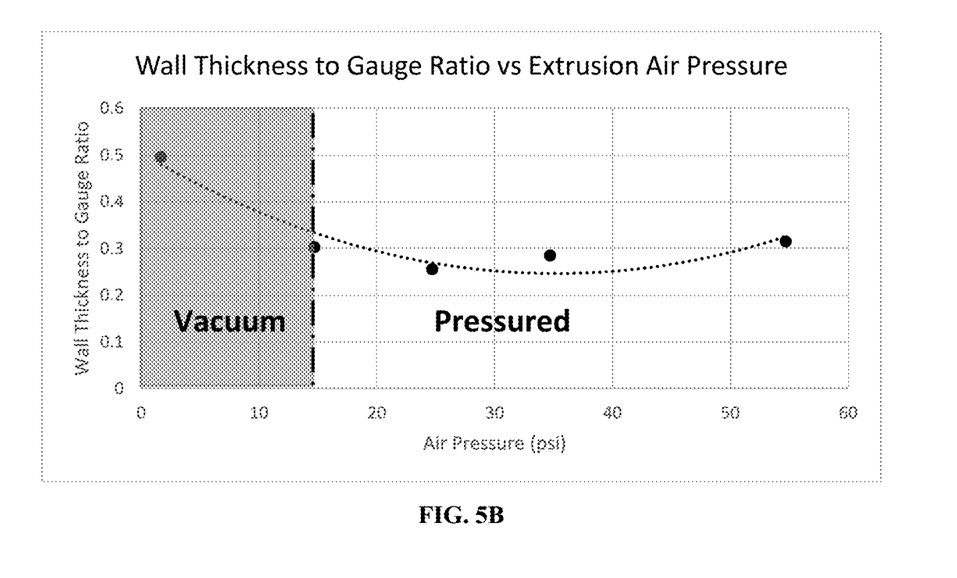
FIG. 5B is a graph depicting total wall thickness to gauge ratio versus foam extrusion air pressure.

As shown by the results of TABLE 6 and the corresponding graphs of FIGS. 5A and 5B, as the total wall thickness to gauge ratio decreases, the % light transmittance improved due to less material obstructing the light's path (see, e.g., FIG. 5A). As shown in FIG. 5B, the distance of material that the light is required to travel through with respect to the foam gauge decreased as the extrusion air pressure increased. As shown in FIG. 4C and as described earlier, % light transmittance increased with increasing pressure (psi) which corresponded to cell size and also less cell wall thickness with respect to the foam gauge, until about 10-20 psi where cell size was negatively affected along with % light transmittance. Accordingly, it may be appreciated that % light transmittance of the foam can be tailored by controlling the total wall thickness to gauge ratio of the foam as another factor alone or in combination with the additional techniques taught by the present disclosure, including to achieve % light transmittance ranges beyond what was explicitly demonstrated in TABLE 6.

Example 5—Effect of Extrusion Air Pressure on Foam Color

Foam samples listed in TABLE 7 below foamed at different extrusion air pressures were measured using a HunterLab color spectrophotometer to measure L, a and b color solid values as described previously.

TABLE 7

|  | L | a | b | Actual Pressure (psi) |
|---|---|---|---|---|
| Under Vacuum | 71.88 | 1.27 | 9.89 | 1.68 |
| Open Air | 67.65 | 1.17 | 10.04 | 14.7 |
| +10 psi | 66.65 | 0.88 | 9.66 | 24.7 |
| +20 psi | 66.37 | 1.18 | 10.01 | 34.7 |
| +40 psi | 74.59 | 6.18 | 15.42 | 54.7 |

Figure 6:
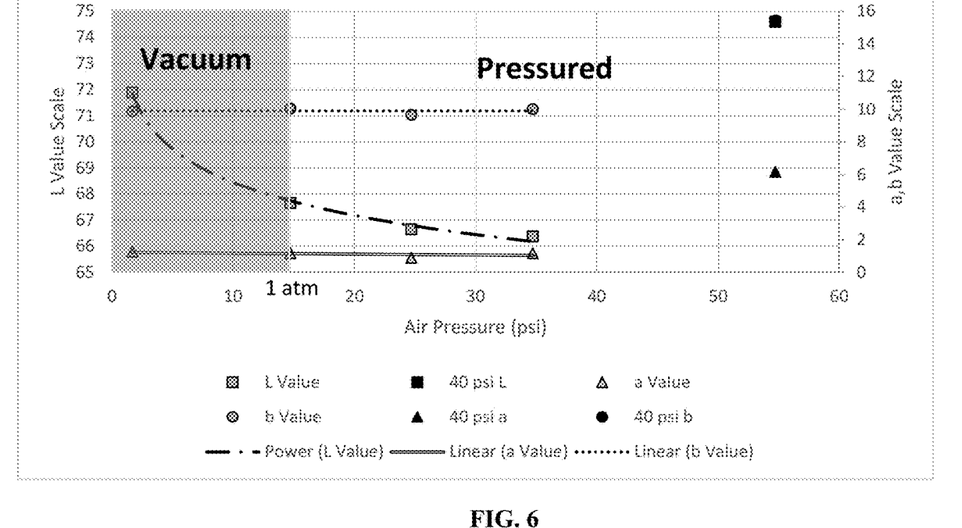
FIG. 6 is a graph depicting foam extrusion air pressure versus L, a, b scale colors of the foam.

As shown by the results of TABLE 7 and the corresponding graph of FIG. 6, as the extrusion air pressure increased, the "L" value decreased, meaning the foam was getting darker while the "a" and "b" values were unaffected.

Example 6—% Light Transmittance Vs. Foaming Agent Diameter

Foam samples listed in TABLE 8 below were measured for % light transmittance based on producing foam samples using a foaming agent (FA) having different average particle diameters in the Cream PP 2 formulation.

TABLE 8

| Sample Name | % Transmittance | FA Diameter (microns) | Cell Size (microns) | Total Wall Thickness to Gauge Ratio |
|---|---|---|---|---|
| 12 microns | 21% | 12 | 259 | 0.416 |
| 15 microns | 22% | 15 | 323 | 0.356 |
| 20 microns | 26% | 20 | 464 | 0.327 |

Figure 7A:
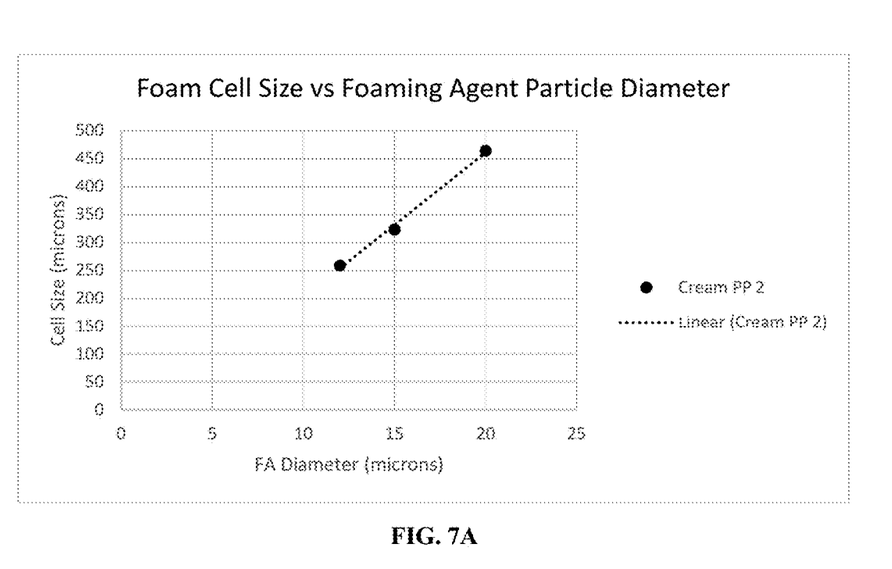
FIG. 7A is a graph depicting foam cell size versus foaming agent particle diameter.
Figure 7B:
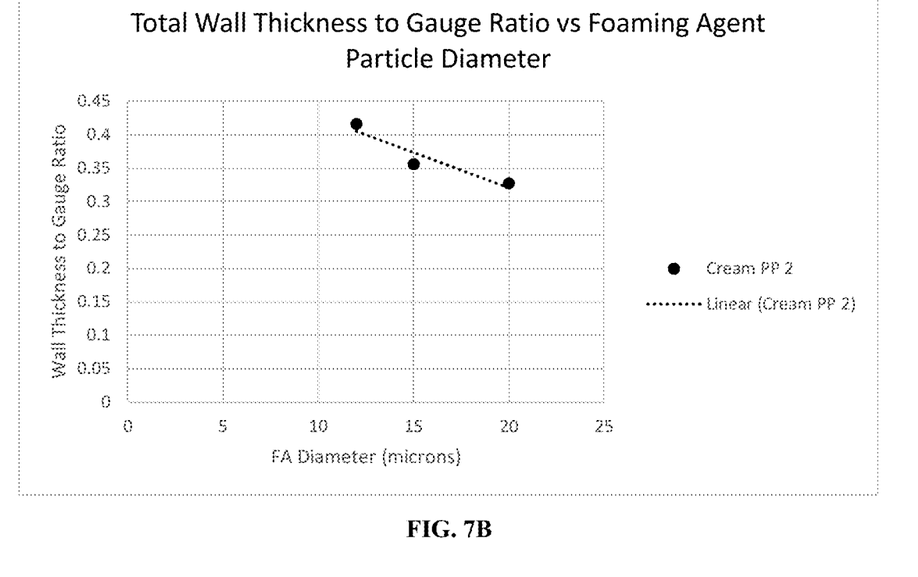
FIG. 7B is a graph depicting total wall thickness to gauge ratio versus foaming agent particle diameter.
Figure 7C:
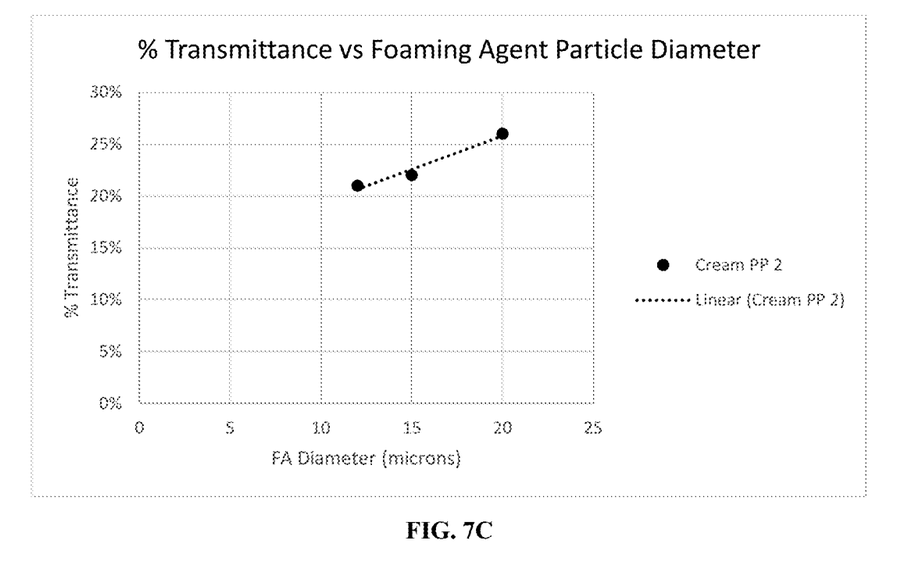
FIG. 7C is a graph depicting % light transmittance versus foaming agent particle diameter.

As shown by the results of TABLE 8 and the corresponding graphs of FIGS. 7A, 7B and 7C, a larger average foaming agent diameter resulted in a larger cell size (FIG. 7A), as the foaming agent diameter increased, the wall thicknesses decreased (FIG. 7B), and consequently the larger the foaming agent diameter, the better % light transmittance was achieved (FIG. 7C). Accordingly, it may be appreciated that % light transmittance of the foam can be tailored by controlling the foaming agent diameter as another factor alone or in combination with the additional techniques taught by the present disclosure, including to achieve % light transmittance ranges beyond what was explicitly demonstrated in TABLE 8.

Example 7—Trial Results 1

Foam samples were further optimized according to the formulation for PP Trials in TABLE 1A to target improved % light transmittance for the automotive interior trim market.

TABLE 9

|  | % Transmittance | Density (pcf) | Basis Weight (lb/sq in) | Cell Size (microns) | Total Wall Thickness to Gauge Ratio | L | a | b |
|---|---|---|---|---|---|---|---|---|
| Cream PP (<1 atm) | 12% | 3.94 | 0.00027 | 200 | 0.356 | 71.90 | 2.68 | 12.19 |
| White PP (<1 atm) | 19% | 3.88 | 0.00027 | 195 | 0.350 | 80.97 | −1.07 | 9.63 |
| Open Air White PP 1 (@ 1 atm) | 29% | 3.85 | 0.00027 | 429 | 0.304 | 73.00 | −1.09 | 9.11 |
| Open Air White PP 2 (@ 1 atm) | 23% | 2.66 | 0.00018 | 279 | 0.179 | 77.54 | −0.61 | 11.63 |
| Open Air White PP 3 (@ 1 atm) | 33% | 4.33 | 0.00016 | 323 | 0.220 | 78.52 | −0.82 | 11.82 |

Figure 8A:
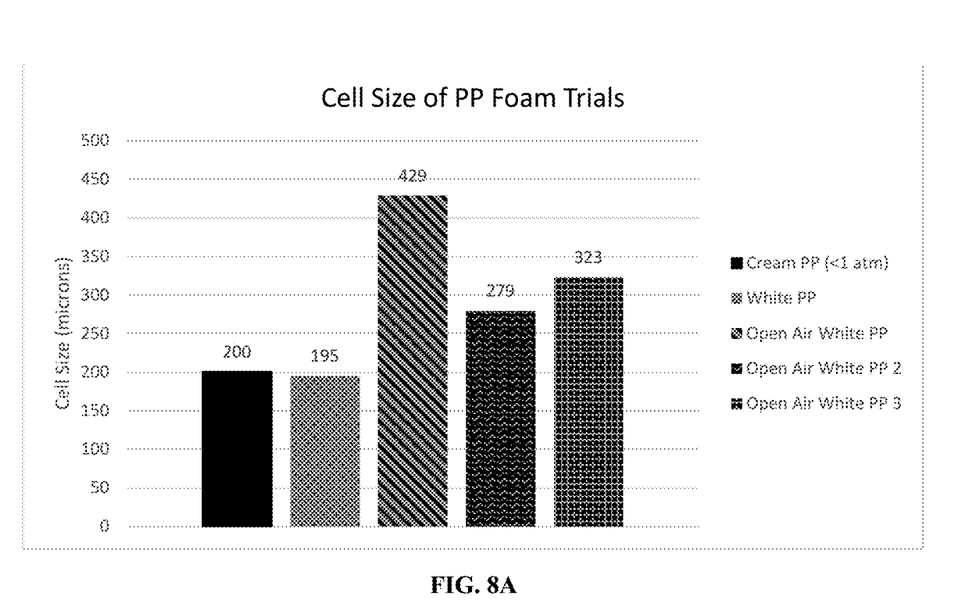
FIG. 8A is a graph depicting cell size of polypropylene trial foam samples.
Figure 8B:
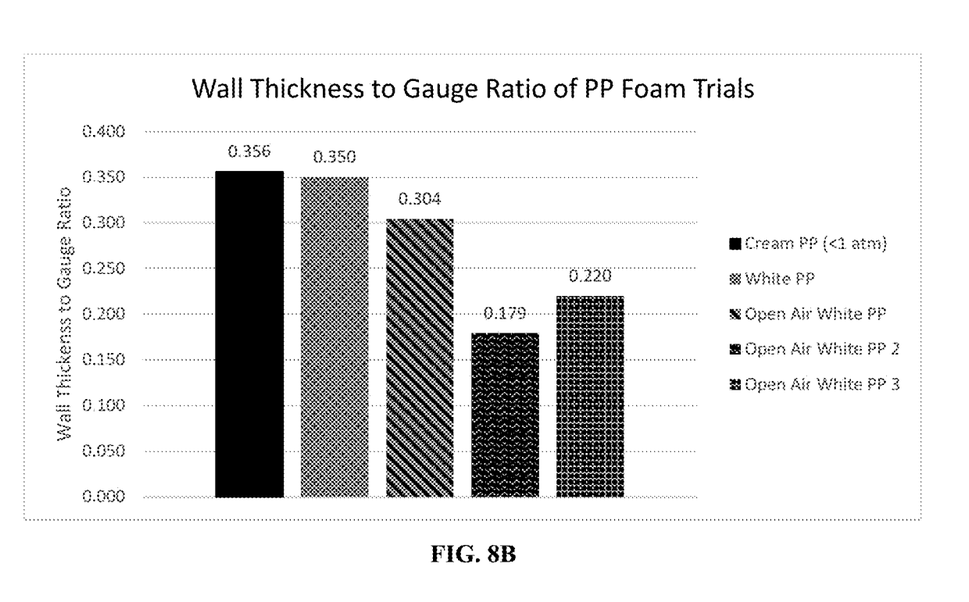
FIG. 8B is a graph depicting wall thickness to gauge ratio of polypropylene trial foam samples.
Figure 8C:
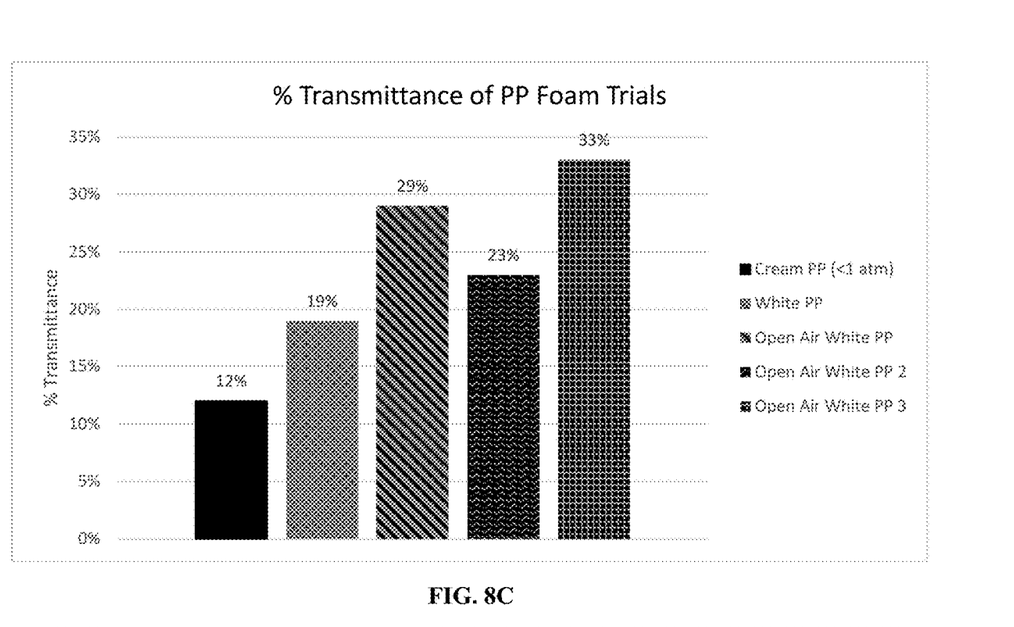
FIG. 8C is a graph depicting % light transmittance of polypropylene trial foam samples.

As shown by the results of TABLE 9 and the corresponding graphs of FIGS. 8A, 8B and 8C, the color of the foam had no effect on the cell size though the open air sample generated much larger cells (FIG. 8A), and the color of the foam likewise had no effect on the cell wall thickness but the open air sample formed thinner cell walls than standard samples extruded below atmospheric pressure (FIG. 8B). As demonstrated by the trial results, utilizing the techniques taught by the present disclosure % light transmittance of a standard grade foam Cream PP compatible with the automotive market was able to be progressively increased from 12% to 33%, however this was not considered to be a maximum increase as other techniques can be utilized as demonstrated to further increase % light transmittance values, such as to about 50%. With respect to FIG. 8C, the Cream PP versus White PP resulted in an increase in light transmittance of 7%, and then White PP to Open Air White PP 1 resulted in a further increase in light transmittance of 10%, thus resulting in a total increase in light transmittance of 17% or about 2.5 times compared to the Cream PP samples.

Example 8—Trial Results 2

Foam samples were further optimized according to the formulation for PP Trials in TABLE 1A to target improved % light transmittance for the automotive market, and then compared with the Cream PP and White PP samples across basis weights.

TABLE 10

|  |  | % Transmittance | Gauge (in) | Density (pcf) | Basis Weight (lb/sq in) |
|---|---|---|---|---|---|
| Cream PP | 1 | 33% | 0.080 | 2.5 | 0.00012 |
|  | 2 | 14% | 0.059 | 5.0 | 0.00017 |
|  | 3 | 9% | 0.110 | 3.0 | 0.00019 |
|  | 4 | 15% | 0.080 | 4.2 | 0.00019 |
| White PP | 1 | 34% | 0.070 | 2.0 | 0.00008 |
|  | 2 | 27% | 0.080 | 2.5 | 0.00012 |
|  | 3 | 23% | 0.110 | 2.0 | 0.00013 |
|  | 4 | 27% | 0.100 | 4.2 | 0.00024 |
|  | 5 | 20% | 0.148 | 3.0 | 0.00026 |
|  | 6 | 18% | 0.161 | 3.0 | 0.00028 |
| PP Trials | Cream PP (<1 atm) | 12% | 0.1196 | 3.94 | 0.00027 |
|  | White PP (<1 atm) | 19% | 0.1194 | 3.88 | 0.00027 |
|  | Open Air White PP 1 (@ 1 atm) | 29% | 0.123 | 3.85 | 0.00027 |
|  | Open Air White PP 2 (@ 1 atm) | 23% | 0.117 | 2.66 | 0.00018 |
|  | Open Air White PP 3 (@ 1 atm) | 33% | 0.065 | 4.33 | 0.00016 |

Figure 9:
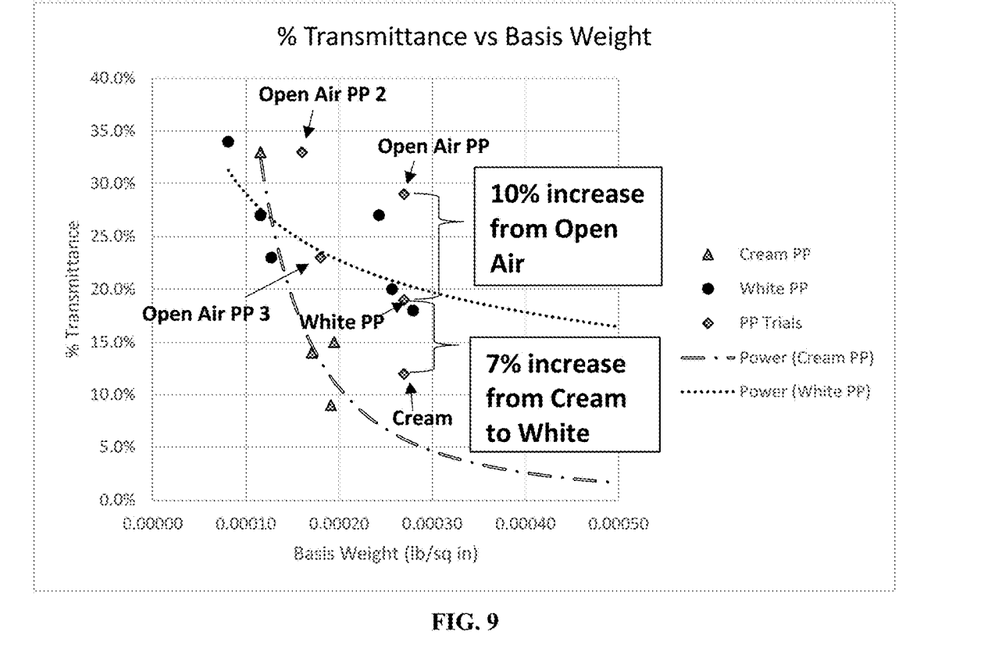
FIG. 9 is a graph depicting % light transmittance versus basis weight of polypropylene trial foam samples.

As shown by the results of TABLE 10 and the corresponding graphs of FIG. 9, the Open Air White PP outperformed all other PP samples for each corresponding basis weight.

According to the present disclosure, the light transmittance of foam may be improved and/or controlled and tailored to a desired range suitable for a wide variety of illuminated end-use applications through the appropriate selection and control of various parameters including cell size, cell wall thickness, total cell wall thickness to gauge ratio, color (including L value), and basis weight in view of the teachings and specific guidance provided herein. The present disclosure is the first to enable producing such a foam through the teachings of appropriate methods including proper selection of foaming agent diameter, extrusion air pressures and compatible formulations, as non-limiting examples.

While the invention has been described with reference to exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A polyolefin foam sheet, comprising:
   an average cell size of about 70 microns to about 500 microns;
   a total cell wall thickness to sheet gauge ratio of between about 0.15 to about 0.55;
   a basis weight of about 0.00005 lb/in$^2$ to about 0.00050 lb/in$^2$;
   an L color solid value of about 95 to about 45; and
   a light transmittance of about 10% to about 50% according to JIS K 7361-1.

2. The polyolefin foam sheet of claim 1, wherein the average cell size is about 80 microns to about 465 microns.

3. The polyolefin foam sheet of claim 1, wherein the average cell size is about 195 microns to about 465 microns.

4. The polyolefin foam sheet of claim 1, wherein the basis weight is about 0.00008 lb/in$^2$ to about 0.00043 lb/in$^2$.

5. The polyolefin foam sheet of claim 1, wherein the basis weight is about 0.00008 lb/in$^2$ to about 0.00027 lb/in$^2$.

6. The polyolefin foam sheet of claim 1, wherein the L color solid value is about 91 to about 65.

7. The polyolefin foam sheet of claim 1, wherein the light transmittance is about 15% to about 45%.

8. The polyolefin foam sheet of claim 1, wherein the light transmittance is about 15% to about 35%.

9. The polyolefin foam sheet of claim 1, wherein the total cell wall thickness to sheet gauge ratio is about 0.18 to about 0.50.

10. The polyolefin foam sheet of claim 1, wherein the total cell wall thickness to sheet gauge ratio is about 0.22 to about 0.50.

11. The polyolefin foam sheet of claim 1, further comprising one or more resins selected from the group consisting of: low density polyethylene (LDPE), linear low density polyethylene (LLDPE); ethylene vinyl acetate (EVA); polypropylene (PP); ethylene propylene diene monomer (EPDM), thermoplastic olefin (TPO), thermoplastic elastomer (TPE), and rubber.

12. A process for producing a polyolefin foam, comprising:
    extruding a foamable sheet at an air pressure from about 1 psi to about 55 psi; and
    foaming the foamable sheet with a foaming agent having an average diameter of about 10 to about 25 microns to produce a foam having a light transmittance of about 10% to about 50% according to JIS K 7361-1.

13. The process of claim 12, further comprising extruding the foamable sheet at an air pressure from about 2 psi to about 30 psi.

14. The process of claim 12, further comprising extruding the foamable sheet at an air pressure from about 25 psi to about 30 psi.

15. The process of claim 12, further comprising extruding the foamable sheet at atmospheric pressure.

16. The process of claim 12, further comprising foaming the foamable sheet with a foaming agent having an average diameter of about 12 microns to about 20 microns.

17. The process of claim 12, wherein the foaming agent comprises azodicarbonamide (ADCA).

18. The process of claim 12, further comprising cross-linking the foamable sheet prior to foaming the foamable sheet.

19. The process of claim 12, wherein the light transmittance is about 15% to about 45%.

20. The polyolefin foam of claim 12, wherein the light transmittance is about 15% to about 35%.

* * * * *